United States Patent [19]
Schiffner

[11] Patent Number: 4,556,321
[45] Date of Patent: Dec. 3, 1985

[54] RING INTERFEROMETER WITH AN ARRANGEMENT TO ELIMINATE FALSE INDICATIONS

[75] Inventor: Gerhard Schiffner, Munich, Fed. Rep. of Germany

[73] Assignee: Siemens Aktiengesellschaft, Berlin and Munich, Fed. Rep. of Germany

[21] Appl. No.: 179,568

[22] Filed: Aug. 19, 1980

[30] Foreign Application Priority Data

Sep. 7, 1979 [DE] Fed. Rep. of Germany ....... 2936285

[51] Int. Cl.$^4$ ............................................... G01B 9/02
[52] U.S. Cl. ................................................... 356/350
[58] Field of Search ............................... 356/350, 351

[56] References Cited

U.S. PATENT DOCUMENTS 4,280,766  7/1981  Goss et al. ........................... 356/350
4,325,636  4/1982  Schiffner .

OTHER PUBLICATIONS

Arditty et al. Publication, "Re-Entrant Fiberoptic Approach to Rotation Sensing", S.P.I.E., vol. 157, Laser Inertial Rotation Sensors, 1978, pp. 138-148.

Primary Examiner—Vincent P. McGraw
Attorney, Agent, or Firm—Hill, Van Santen, Steadman & Simpson

[57] ABSTRACT

A ring interferometer which has a light waveguide with two ends which act as the two separate coupling points so that light from a source can be coupled into each of the ends to travel in the light waveguide to be uncoupled from the opposite end as an output beams characterized by the source of light emitting light pulses whose duration is smaller than the transit time of the light in the light waveguide and whose time interval between pulses is greater than the transit time.

4 Claims, 1 Drawing Figure

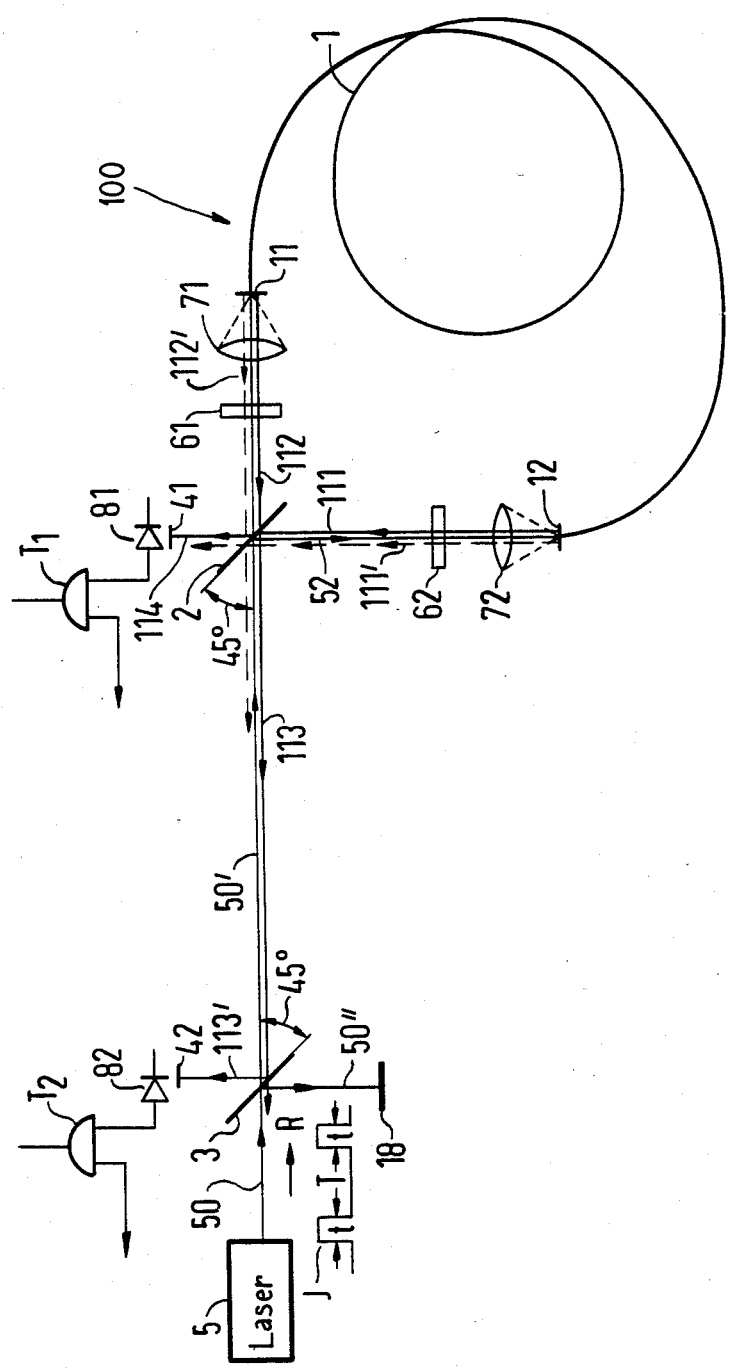

RING INTERFEROMETER WITH AN ARRANGEMENT TO ELIMINATE FALSE INDICATIONS

BACKGROUND OF THE INVENTION

The present invention is directed to a ring interferometer which has a light source, at least one light sensitive surface of a detector, a light waveguide which is wound in a coil and has two ends, each end providing a separate coupling point at which light from the source is coupled into the light waveguide and propagated to the opposite end for output coupling as an output beam, the interferometer includes an arrangement for receiving the output beams and combining portions thereof in a superimposed fashion to extend along a superimposed path extending to at least one of the light receiving surfaces.

Ring interferometers of this type serve for example to identify rotations and to measure the angular speed thereof. In so doing, they employ the relativistic Sagnac effect, which produces non-reciprocal transit time differences, which are proportional to the angular speed of the rotation. The Sagnac effect will apply to all polarization states of the light. A measurement is carried out of the transit time difference and thus the angular speed is determined by the integral intensity of the light receiving surfaces of the detectors. However, it should be stressed that this merely represents an example of the use of a ring interferometer and that ring interferometers of the type described in the introduction are also used for other purposes.

In ring interferometers of this type, a component of the light, which is to be input coupled at the coupling point, is reflected or back scattered which is due to a jump or change in the index of refraction or other inhomogenities. This reflected or back scattered component is superimposed upon the light which is output coupled from the light waveguide at this coupling point. The reflected or back scattered component together with the output coupled light is propagated as undesirable interference light towards the light receiving surfaces.

The undesirable interference light will occur at both coupling points and produces interference in the superimposition zone whereby the intensity of the light being received on the surface of the detector is adulterated. In the present example in which a ring interferometer is used as a rotation sensor, these adulterations will cause simulated or false indications of rotations.

SUMMARY OF THE INVENTION

The present invention is directed to providing an improved ring interferometer in which the adulterating influences of the undesirable interference light can be eliminated.

These tasks are accomplished by an improvement in a ring interferometer having a light source, at least one light sensitive surface of a detector and a waveguide which is wound in a coil and has two ends, each end providing a separate coupling point at which light from the light source is coupled into the light waveguide and propagated to the opposite end for output coupling therefrom as an output beam, said interferometer including means for receiving the output beams and directing portions thereof in a superimposed fashion to the light receiving surface. The improvement comprises said light source being a pulse light source producing a sequence of individual light pulses having a pulse duration (t) and an interval of time (T) between two consecutive individual light pulses and said pulse duration (t), the interval of time (T) and a predetermined length of the light waveguide between the coupling points are matched to one another so that the pulse duration (t) is smaller than the length of travel or transit time required by the light to pass over the predetermined length of the light waveguide and the interval of time (T) between pulses is greater than said length of travel or transit time. In the perferred embodiment, the predetermined length corresponds to the overall length of the light waveguides.

BRIEF DESCRIPTION OF THE DRAWING

The FIGURE is a schematic illustration of an example of a ring interferometer in accordance with the present invention.

BRIEF DESCRIPTION OF THE PREFERRED EMBODIMENTS

The principles of the present invention are particularly useful in a ring interferometer generally indicated at 100 in the drawing. The ring interferometer 100 consists of a pulsed, coherent light source 5, two partially transparent reflectors or beam dividers 3 and 2, two linear polarizers 61 and 62, two optics 71 and 72, a wound or coiled light waveguide 1, and two light receiving surfaces 41 and 42 which are represented as a light sensitive surface of a light sensitive sensor or detector 81 and 82. It should be noted that the wound light waveguide 1 is preferably a monomode glass fiber and has two ends 11 and 12 which act as coupling points for the wound waveguide.

The pulsed light source 5, which is preferably a laser, emits light pulses J in the form of a bundle of laser beams 50 in a direction indicated by the arrow R. The beams 50 strikes the semi-transmissive mirror or reflector 3 which is preferably inclined at an angle 45° to the axis of the beams and the direction R. The mirror 3 will reflect a component of the laser beams 50 at right angles as a partial beam 50'' to strike a light absorber 18. The mirror 3 also passes a remaining portion of the laser beams 50 as a weakened beams 50' which travels in the direction R and impinges on the semi-transmissive mirror or reflector 2, which is likewise preferably inclined at the angle of 45° to the axis of the beam 50 and the direction R. Like the mirror 3, the mirror 2 will reflect a portion of the beam 50' at right angles to the direction R as a partial beams 52 and pass a portion as a partial beams 51 which continues to extend in the direction R. The partial beam 51 passes through the polarizer 61 and is focused by optical lens system 71 onto an end 11 of the light waveguide 1. The partial beam 52 passes through the polarizer 62 and is focused by the lens system 72 onto the end surface 12 of the waveguide 1.

The light, which is coupled into the light waveguide 1 at one of the ends such as 11, will travel through the light waveguide and be output coupled at the other end 12. This light which is output coupled at the end 12 is focused by the lens system 72 to form an output beam 111 extending in a direction opposite to the direction of partial beam 52 and at right angles to the direction R. In a similar manner, light, which was coupled by the lens system 72 into the end 12, will travel through the waveguide 1 and exit or be uncoupled at the end 11 as an output beam 112 which is traveling in the opposite direction to the beam 51 and the direction R.

The partial beam 112 will strike the partially reflective mirror 2 and have a portion reflected at right angles to its path and another portion passed by the mirror to extend in a direction opposite to the direction R. In a similar manner, the beam 111 will also strike the mirror 2 and have a portion reflected by the mirror 2 and be superimposed with a portion of the beam 112 which passed through the mirror 2 to form a superimposed portion 113 that extends opposite to direction R and beams 50'. A portion of the beam 111 will pass through the mirror 2 and be superimposed with the reflected portion of the beam 112 as a superimposed beam 114.

The sensor or light receiving surface 41 of detector 81 is arranged in the path of the beam 114. The beam 113 will be directed at the semi-transmissive mirror 3 which reflects away a component 113' of this beam 113. In the beam path of the beam 113', the light receiving or sensor surface 42 of detector 82 is arranged.

When the light is input coupled into the light waveguide 1 at each of the coupling points 11 and 12, a component thereof is reflected or back scattered by the end surface 11 and 12 due to the change in the index of refraction to create undesirable interference light. As illustrated, the end surface at the coupling point 11 creates at an undesirable interference light 112' which travels in the same light path as the output beam 112. In a similar manner, the surface forming coupling 12 will create an undesirable interference light 111' which travels in the same direction as the output beam 111. Thus, the undesirable interference light 111' and 112' will reach the superimposition zones which are the beam paths for the beams 113 and 114, respectively.

In order to eliminate the adulterations caused by the interference light 111' and 112', the invention provides that the light source consists of a pulse light source 5 which produces a sequence of individual light pulses and that the pulse duration (t) of one individual pulse, the interval of time (T) between two successive individual light pulses and the predetermined length of the light waveguide 1 between the coupling points 11 and 12 are matched to one another in such a manner that the pulse duration (t) is smaller than the length of the transit time required by the light to travel over the predetermined length of the light waveguide and that the interval of time (T) is greater than the length of the transit time.

A detailed explanation will be based on a practical example. The light source 5 consists of a semi-conductive laser which is operated with a pulse frequency of 1 kHz and emits light pulses of 50 ns duration. The predetermined length of the light waveguide amounts to approximately 1 km and corresponds to the length of the light waveguide, which is a monomode light waveguide and consists of a core cladded glass fiber.

Under these conditions, the pulse width thus amounts to 50 ns, the interval of time between the pulses amounts to approximately 1 ms and the time taken by the light to pass from one coupling point to another in the light waveguide 1 amounts to a few $\mu$s.

This means that the undesirable interference light pulses such as 111' and 112', which occur primarily at the coupling points, strike against a light receiving surface a few $\mu$s earlier than the useful light pulses which pass through the light waveguide and are output coupled at the coupling points. In this way, the undesirable interference light and the useful light are entirely separated from one another and the undesirable interference light pulses can be filtered or gated out for example by a gate circuit.

However, the undesirable interference light, which occurs inside the light waveguide, can also generally speaking be isolated and gated out by means of the proposed theory. Only interference light, which occurs within a specific conductor zone around a midpoint or center section of the light conductor can not be gated out or removed. The reason for this is that approximately half of the transit time has been consumed by the time the light input coupled at a coupling point reaches the center portion of the conductor zone and only at this point does the interference light occur for example at a scattering point. Thus, this interference light occurs at a time at which the useful light reaches the conductor zone around the center portion of the waveguide. Consequently, interference light pulses and the useful light pulses occur very closely adjacent to one another or are even superimposed upon one another. When the interference light pulse and the useful light pulse occur too closely to one another or are even superimposed to one another, it is no longer possible for them to be isolated from one another. However, measured against the total undesirable interference light, which occurs in the entire interferometer 100, the interference light component which arises in the conductor zone around the center portion is negligible and in the finale outcome does not result in any substantial interference.

Since the transit time of the useful light pulse from the light source to the light receiving surface can be easily measured and since the undesirable interference light pulses fall between the useful light pulses, the undesirable interference light pulses can be easily gated out by connecting the output of the sensors 81 and 82 to a gate circuit $T_1$ and $T_2$, respectively. For example, the gate circuits $T_1$ and $T_2$ can be triggered by the light source 5 via a delay line. In this case following the dying away of the individual undesirable interference light pulses and prior to receiving the useful light pulse, the gate circuit is opened and before the next appearance of the next undesirable interference light pulse it is closed. As a result, only pulses, which originate from the useful light pulses pass through the gate circuit. The gate can consist for example of an AND-gate, which possesses two inputs. One of these inputs is connected to the output of the sensor and the other is connected to the trigger output of the light source.

It should be noted that apart from the conditions stated in applicant's improvement, no special significance need be assigned to the particular construction of the ring interferometer. Thus, for example, in place of the partially transparent reflector 2, it is possible to use any other reciprocal optical quad gate having the same properties. Thus, the partially transparent reflector or beam divider 2 can be replaced by an optical directional coupler such as proposed for example in the earlier filed U.S. patent application, Ser. No. 002,537, filed Jan. 11, 1979, which issued as U.S. Pat. No. 4,325,636 and was based on German patent application No. 28 04 119 and whose disclosure is incorporated by reference thereto.

In addition, the ring interferometer applications are not restricted. Thus, for example, it can also be used for measurement purposed for which polarized light is not required. In the example in question, the polarizers 61 and 62 can then be eliminated. However, since polarizers often result in automatically filtering out a large proportion of the interference light, particularly that created by depolarization, it should be noted that it is often desirable to continue to use the polarizers.

Although various minor modifications may be suggested by those versed in the art, it should be understood that I wish to embody within the scope of the patent granted hereon, all such modifications as reasonably and properly come within the scope of my contribution to the art.

I claim:

1. In a ring interferometer having a light source, at least one light sensitive surface of a detector, a light waveguide which is wound in the coil and has two ends, each end providing a separate coupling point at which light from the coherent source is coupled into the light waveguide and propagates to the opposite end for output coupling therefrom as output beams, said interferometer including means for receiving the output beams and directing portions thereof in a superimposed fashion to the light receiving surface, the improvements comprising means for reducing adulterating influences of undesirable interference light from reflected and backscattered light components, said means for reducing including said light source being a pulsed light source producing a sequence of individual light pulses having a pulse duration (t) and an interval of time (T) between two consecutive light pulses, said pulse duration (t), said interval of time (T) and a predetermined length of the light waveguide between the coupling points being matched to one another so that the pulse duration (t) is smaller than the length of travel time required by the light to pass over the predetermined length of the light waveguide and the interval of time (T) between pulses is greater than said length of travel time, and said means for reducing including means for gating out a majority of the undesirable interference light at each detector.

2. In a ring interferometer according to claim 1, wherein the predetermined length corresponds to the overall length of the light waveguide.

3. In a ring interferometer according to claim 1, wherein said means for gating out includes a gate circuit being triggered by a pulse from said light source so that the gate circuit is closed except to a point in time just prior to the detector receiving the superimposed output beam.

4. An interferometer, comprising:
a loop of fiber optic material;
means for introducing a first light pulse and a second light pulse into said loop, said first and second light pulses having opposite directions of travel in said loop so that said first and second light pulses overlap in a predetermined segment of said loop;
means for combining said first and second light pulses to form an interference pattern; and
means for monitoring the interference pattern, said monitoring means being responsive to backscattered waves which originate only in said predetermined segment.

* * * * *